United States Patent
Abrahamson

(10) Patent No.: US 9,594,161 B2
(45) Date of Patent: Mar. 14, 2017

(54) METHOD AND DEVICE FOR SEARCHING THROUGH COLLAPSED GROUND

(75) Inventor: Staffan Abrahamson, Linkoping (SE)

(73) Assignee: TOTALFORSVARETS FORSKNINGSINSTITUT, Stockholm (SE)

(*) Notice: Subject to any disclaimer, the term of this patent is extended or adjusted under 35 U.S.C. 154(b) by 452 days.

(21) Appl. No.: 14/003,556

(22) PCT Filed: Mar. 8, 2012

(86) PCT No.: PCT/SE2012/000030
§ 371 (c)(1),
(2), (4) Date: Sep. 6, 2013

(87) PCT Pub. No.: WO2012/125100
PCT Pub. Date: Sep. 20, 2012

(65) Prior Publication Data
US 2013/0335257 A1  Dec. 19, 2013

(30) Foreign Application Priority Data

Mar. 11, 2011  (SE) ........................ 1100177

(51) Int. Cl.
*G01S 13/04* (2006.01)
*G01S 13/88* (2006.01)
(Continued)

(52) U.S. Cl.
CPC .......... *G01S 13/885* (2013.01); *G01S 13/56* (2013.01); *A63B 29/021* (2013.01);
(Continued)

(58) Field of Classification Search
CPC ................ G01S 13/885; G01S 13/56
(Continued)

(56) References Cited

U.S. PATENT DOCUMENTS 3,286,163 A * 11/1966 Holser ............... G01V 3/30
250/269.1
3,760,400 A  9/1973 Galvin et al.
(Continued)

FOREIGN PATENT DOCUMENTS

DE  4309599  9/1994
EP  0895095  2/1999
(Continued)

OTHER PUBLICATIONS

Arai, I., "Survivor search radar system for persons trapped under earthquake rubble," in Microwave Conference, 2001. APMC 2001. 2001 Asia-Pacific, vol. 2, No. pp. 663-668 vol. 2. Dec. 3-6, 2001.*
(Continued)

*Primary Examiner* — Marcus Windrich
(74) *Attorney, Agent, or Firm* — Jacobson Holman, PLLC.

(57) ABSTRACT

The invention relates to a device and a method for determining whether a living person has been buried in collapsed ground. The device consists of a rod provided with a receiver unit and a signal processing unit. The receiver unit is intended to receive reflected radar signals transmitted from a radar transmitting antenna and transfer these signals to the signal processing unit. The signal processing unit which is provided with specific detection units determines whether the received signal have been Doppler shifted. By determining that the device can decide whether the Doppler shift depends on the moving chest of a breathing person buried alive.

3 Claims, 5 Drawing Sheets

Figure 1:
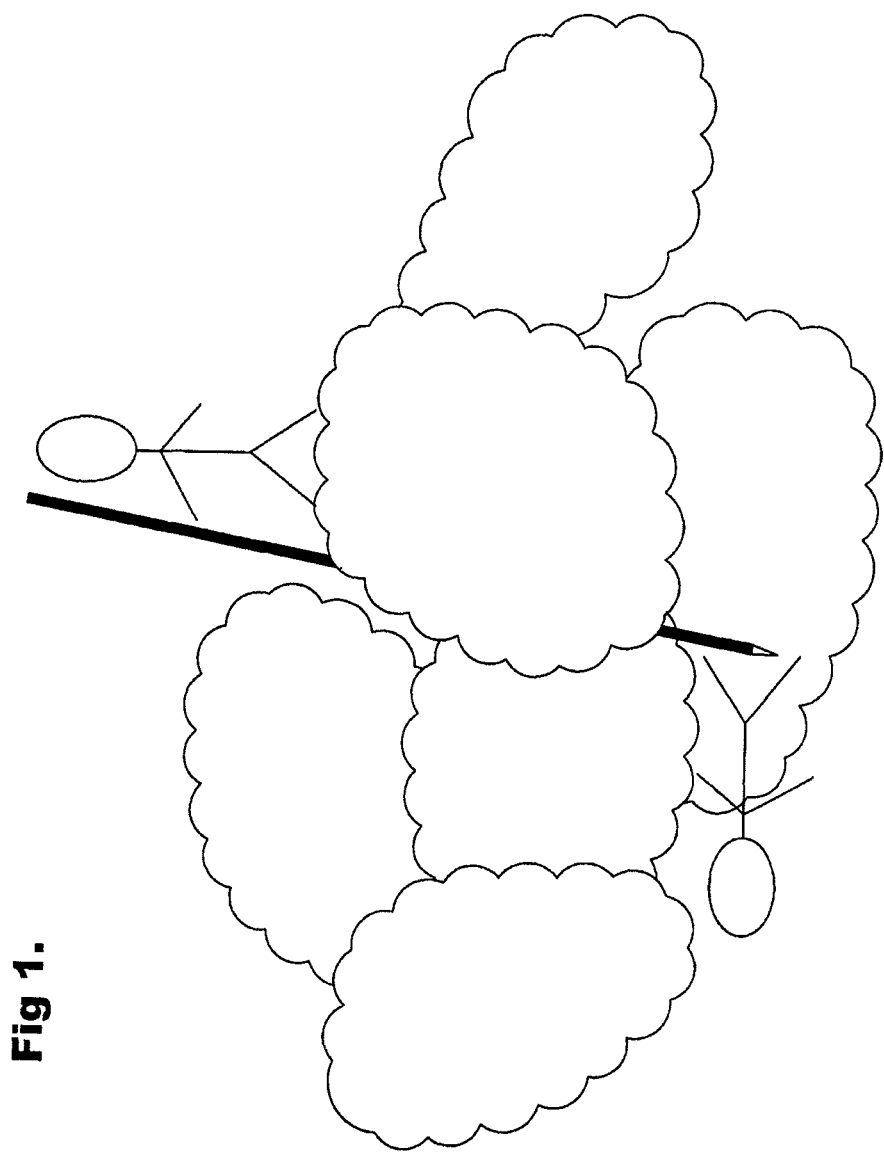

(51) Int. Cl.
*G01S 13/56* (2006.01)
*A63B 29/02* (2006.01)

(52) U.S. Cl.
CPC ..... *A63B 2220/802* (2013.01); *A63B 2225/50* (2013.01); *A63B 2230/00* (2013.01)

(58) Field of Classification Search
USPC .......................................................... 342/22
See application file for complete search history.

(56) References Cited

U.S. PATENT DOCUMENTS

| | | | | |
|---|---|---|---|---|
| 4,297,699 | A | * | 10/1981 | Fowler ...................... E21B 7/06 175/41 |
| 4,691,204 | A | | 9/1987 | Hiramoto |
| 4,717,252 | A | | 1/1988 | Halidorsson et al. |
| 4,905,707 | A | | 3/1990 | Davies et al. |
| 5,028,929 | A | | 7/1991 | Sand et al. |
| 5,552,786 | A | * | 9/1996 | Xia ........................... G01V 3/30 342/22 |
| 5,557,277 | A | | 9/1996 | Tricoles et al. |
| 5,828,331 | A | | 10/1998 | Harper |
| 6,031,482 | A | * | 2/2000 | Lemaitre ................. G01S 7/415 342/22 |
| 6,509,835 | B1 | | 1/2003 | Krubiner et al. |
| 6,573,855 | B1 | | 6/2003 | Hayakawa et al. |
| 6,667,709 | B1 | | 12/2003 | Hansen et al. |
| 6,714,153 | B1 | * | 3/2004 | Kong ........................ G01V 3/30 324/323 |
| 6,864,826 | B1 | | 3/2005 | Stove |
| 7,042,224 | B2 | | 5/2006 | Fujiwara |
| 7,057,548 | B1 | | 6/2006 | Roberts |
| 7,095,222 | B2 | | 8/2006 | Davila |
| 7,511,654 | B1 | * | 3/2009 | Goldman ............... G01S 13/885 342/179 |
| 7,567,200 | B1 | * | 7/2009 | Osterweil ............. A61B 5/1117 340/573.1 |
| 7,690,258 | B2 | | 4/2010 | Minagi et al. |
| 7,930,103 | B2 | | 4/2011 | Young et al. |
| 2001/0055544 | A1 | * | 12/2001 | Copp ....................... G01N 1/22 422/98 |
| 2002/0008655 | A1 | | 1/2002 | Haj-Yousef |
| 2002/0011947 | A1 | | 1/2002 | Stolarczyk et al. |
| 2002/0175849 | A1 | | 11/2002 | Arndt et al. |
| 2003/0169053 | A1 | | 9/2003 | Fujiwara |
| 2005/0022606 | A1 | * | 2/2005 | Partin .................. A61B 5/0205 73/773 |
| 2005/0156600 | A1 | * | 7/2005 | Olsson ...................... G01S 7/03 324/329 |
| 2005/0156776 | A1 | | 7/2005 | Waite |
| 2005/0237061 | A1 | | 10/2005 | Cloutier et al. |
| 2006/0055584 | A1 | | 3/2006 | Waite et al. |
| 2006/0152404 | A1 | | 7/2006 | Fullerton et al. |
| 2007/0090989 | A1 | | 4/2007 | Weil |
| 2007/0205937 | A1 | | 9/2007 | Thompson et al. |
| 2008/0028827 | A1 | | 2/2008 | Andrews et al. |
| 2009/0135045 | A1 | | 5/2009 | Beeri |
| 2010/0069745 | A1 | | 3/2010 | Muehlsteff et al. |
| 2010/0277358 | A1 | | 11/2010 | Duvoisin et al. |
| 2011/0025546 | A1 | | 2/2011 | Cook et al. |
| 2011/0202277 | A1 | | 8/2011 | Haddad |
| 2013/0076557 | A1 | | 3/2013 | Shaw et al. |
| 2013/0106642 | A1 | | 5/2013 | Tomich et al. |
| 2013/0207830 | A1 | | 8/2013 | Watts et al. |
| 2013/0335257 | A1 | | 12/2013 | Abrahamson |

FOREIGN PATENT DOCUMENTS

| | | |
|---|---|---|
| GB | 2393872 | 4/2004 |
| JP | H09-304525 | 11/1997 |
| JP | 10-325927 | 12/1998 |
| JP | 2006-055406 | 3/2006 |

OTHER PUBLICATIONS

Arai, I., "Survivor search radar system for persons trapped under earthquake rubble," in Microwave Conference, 2001. APMC 2001. 2001 Asia-Pacific , vol. 2, No., pp. 663-668 vol. 2, Dec. 3-6, 2001.*
Arai et al. Survivor search radar system for person trapped under earthquake rubble. Proceedings of APMC2001, Dec. 3, 2001, vol. 2, pp. 663-668.
Grazzini et al. An ultra-wideband high-dynamic range GPR for detecting buried people after collapse of buildings. Ground Penetrating Radar, 13th International Conference On, IEEE, Jun. 21, 2010, pp. 1-6.
Zade et al. "A Modern Microwave Life Detection Sytsem for Human Being buried Under Rubble" International Journal of Advanced Engineering Research and Studies E, Oct. 1, 2011.

* cited by examiner

METHOD AND DEVICE FOR SEARCHING THROUGH COLLAPSED GROUND

This is a national stage of PCT/SE12/000030 filed Mar. 8, 2012 and published in English, which has a priority of Sweden no. 1100177-3 filed Mar. 11, 2011, hereby incorporated by reference.

The present invention relates to a receiver for radar signals and a method that utilize said receiver for searching collapsed ground with the intention to decide whether people have been buried in the collapsed masses. More specifically it relates to a receiver and a method that uses the Doppler shift of frequencies and wavelengths to identify movement of possibly buried persons. In one embodiment of the invention it is also possible to localize the buried person and hence make it easier for the rescue crew to excavate the person.

BACKGROUND OF THE INVENTION

The invention primarily relates to a receiver designed to detect whether persons are buried in collapsed ground. With collapsed ground is meant anything from house ruins resulting from i.e. earthquakes or explosions to avalanches. Since it is a matter of life and death to quickly excavate persons buried in the masses, all methods that quickly localize the positions to start excavating are of great interest. During for example avalanches, where large amounts of snow are swept away, it is increasingly hard to localize persons if one does not possess techniques that give a first indication of where to search. Furthermore, the inaccessibility of the collapsed ground during for example earthquakes is troublesome for the rescue crew since it is tough to force ones way through the surroundings. There is a therefore a need for a device that is both easy to use and give the rescue crew reliable indications whether persons are buried in the masses. If the device furthermore is able to indicate the locations of these persons this would also be a positive feature. A device according to the present invention provides for all these positive features.

The device according to the invention consists of at least one radar generating and radar transmitting means, a receiver device and a signal processing unit connected to said receiver device. The task of giving a first indication whether persons are buried in the masses is performed by means of transmitting a radar signal into the ground whereby the receiver is designed to receive the reflected signal. The reflected signal is subsequently analyzed in the signal processing unit to decide whether there are persons/moving objects present in the masses. The analyzing step is searching for Doppler shifts in the received signal. A Doppler shift is a phenomenon that emerges when a source is moving relative the signal transmitting device. This movement will lead to shifts in the received frequencies or wavelengths relative the transmitted ones. Since Doppler shifts are relevant when an object is moving relative the signal source, a detection of a Doppler shift in the received signal will correspond to the fact that an object in the collapsed ground is moving. The present invention is searching for those small Doppler shifts that are present when there are minor movements from the object. The minor movements could, for example, be movements pertaining to breathing whereby the chest is moving relative the signal source. Due to the very small relative movements there is needed a signal processing that is highly sensitive. The present invention comprises a signal processing unit with those features.

BACKGROUND ART

In attacking the problem of detecting persons buried in collapsed ground it is known to utilize radar. In the known methods within the technical field it is taught to equip a helicopter with a radar device, transmit signals into the ground and receive the reflected signals. These signals are then analyzed to decide whether the electromagnetic wave has been scattered against a discontinuity in the ground. One example of such a discontinuity could be a buried person. One problem with this particular method is that the discontinuity could be something else rather than a person. This method is therefore more suited to applications relating to the searching of snow since it is likely that the snow is homogenous and that the discontinuity most probably will be persons buried in the snow. A problem with radar equipped helicopters aiming to use the Doppler shifts according to the present invention is that the movement and vibrations of the helicopter makes it practically impossible to detect small movements. Also the problematic shielding of the background would affect it negatively.

The present invention overcomes these problems by actively searching for moving objects in the ground and it does not rely on the ground being homogenous. Furthermore, the relative smallness of the device allows for the rescue crew to bring it along during a rescue mission and thus to control where in the area a search shall be performed. This makes the device an excellent tool for those cases when it is not possible to use for example radar equipped helicopters. This could for example be the case during war situations. All in all the invention provides for a secure and easy to use system that can be used both as a complement to helicopter borne systems and by itself on location.

BRIEF DESCRIPTION OF THE COMPONENTS OF THE INVENTION

Before a more detailed description of the invention is given we provide a brief review of those components in the invention that are necessary to be able to detect the small Doppler shifts that, for example, relates to the heaving of a chest during breathing. Since breathing movements leads to very small Doppler shifts, signal processing functions are used that are designed to detect small changes and discard Doppler shifted signals relating to movements that cannot be derived from movements of the chest. For example, Doppler shifts relating to movements of rats. These particular signal processing functions are referred to as main detection and supplementary detection and they will be described in what follows.

The components and units in the device according to the invention will be described functionally and we therefore give short definitions of the terms used.

Figure 4:
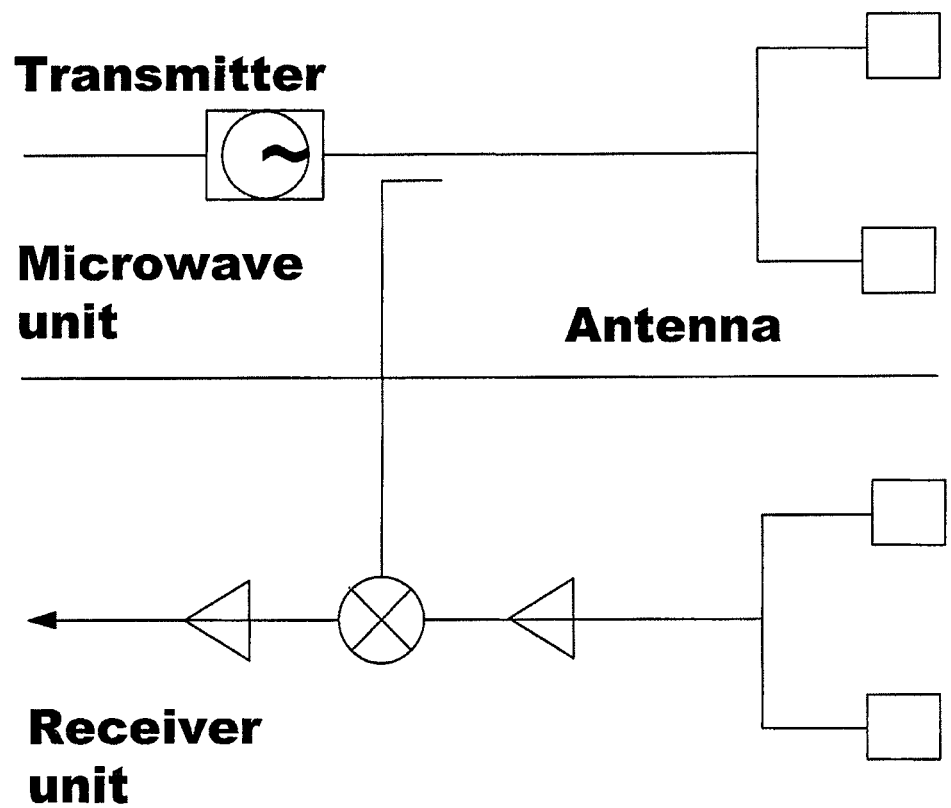

With radar transmitting device is intended an antenna and a microwave unit according to, for example, FIG. 4. This constitutes a conventional design. The important parameter for the intended application is that the device can be adapted to transmit radar of such frequencies that the intended search depth can be reached. In general a frequency of 300 MHZ to 10 GHz is needed. The chosen frequency is preferably adapted to the ground conditions in the area to be searched. The radar transmitting device and the radar receiving device are preferably fed by a battery with the possibility to make the device according to the invention wireless. Alternatively the rod could be connected to a power source by means of a cable. This could however lead to problems since the cable could be damaged by, for example, sharp rocks.

With band-pass filter, which is incorporated in the receiving device according to claim 1, is intended a device that filter out certain specific frequencies. In the present case the incoming signal (that is, the signal that has been reflected from the buried object) will be filtered so that only Doppler frequencies will be processed. Usually these frequencies are in the range 0.03 to 10 Hz.

With the term detector or differential detector is intended a for the detection essential signal processing function which is designed to continuously compare the amplitude of the signal to obtain a derivative (slope of the curve) that reflects the frequency change of the signal. With continuously is meant that the signal is sampled many times during a short time interval, for example 100 times during a second. It is based on these samplings that a comparison is done and a derivative is obtained. The amplitude of the derivative will be zero, positive or negative. To obtain information about the derivative that is relevant for the detection, the signal processing unit creates an absolute value of the derivative. To lessen the influence of fluctuations of the derivative and possible faults due to multiple Doppler shifts relative the sampling frequency this particular signal processing unit is also designed to create a mean value of the absolute value (usually 2-5 times).

With a decision processor is intended a signal processing unit that sets a threshold level in the processor where said threshold level corresponds to the fact that the background noise has been exceeded. To ascertain that it is a person that has been detected the value of the derivative obtained from the detector shall exceed said threshold level. This level thereby constitutes a threshold value for a possible detection.

With presentation device is intended a device that presents the results of the signal processing for a user. This device could, for example, constitute a display but it could also be a presentation based on sound.

With DFT is intended Discrete Fourier Transform which transform the incoming signal to the frequency domain. With FFT is meant Fast Fourier Transform, which constitutes a quick version of DFT.

With frequency/amplitude-detector is intended a device that detects the changes in the frequency or amplitude of the signal.

DRAWINGS

FIG. 1 discloses schematically the device during use.

Figure 2:
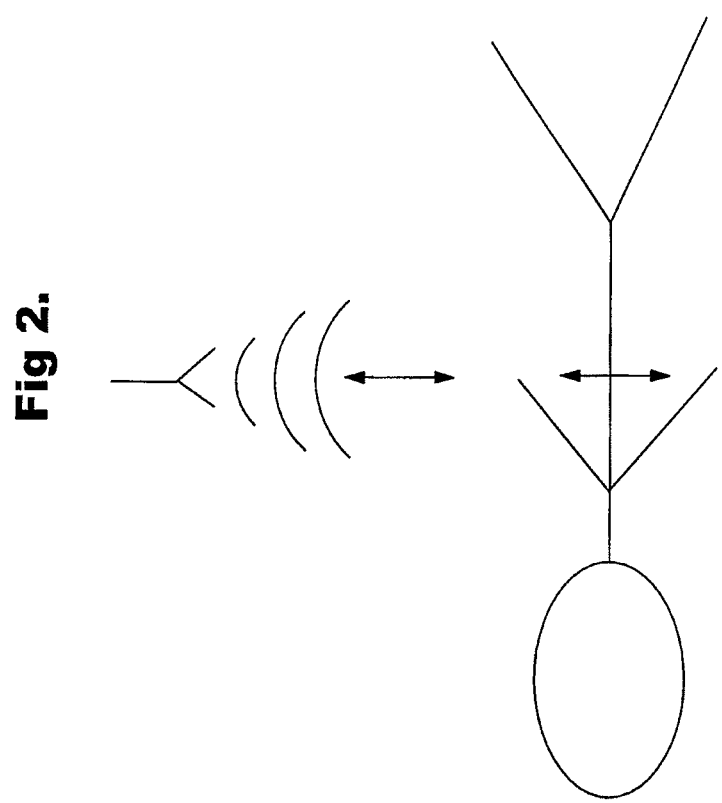

FIG. 2 discloses schematically how a person's breathing affects the reflected radar signals.

Figure 3:
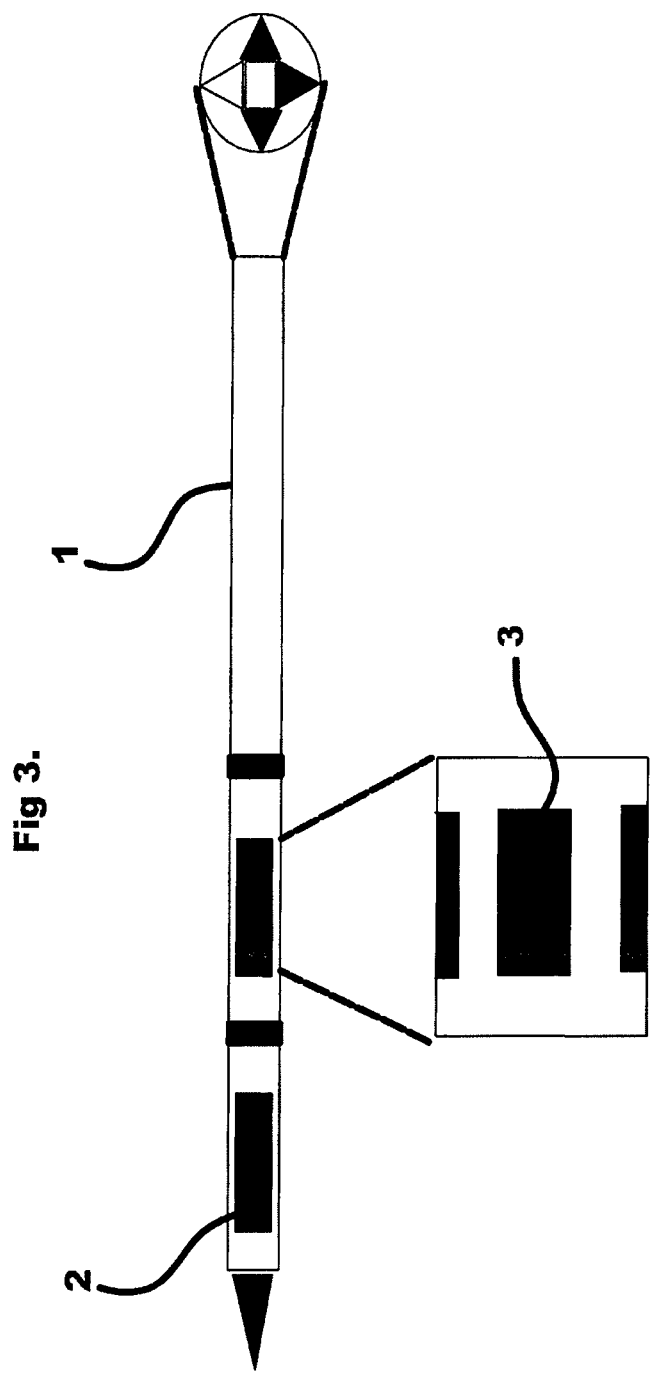

FIG. 3 discloses the division of the rod into sections and also the division into sectors. In the figure two sectors are disclosed. In an enlarged view of the section, parts of three sectors are shown. In the second enlarged segment it is schematically shown how an alarm informs the user about the direction and at what depth the detection has been made.

FIG. 4 discloses a version of the antenna and microwave part for the radar transmitting device according to the invention.

Figure 5:
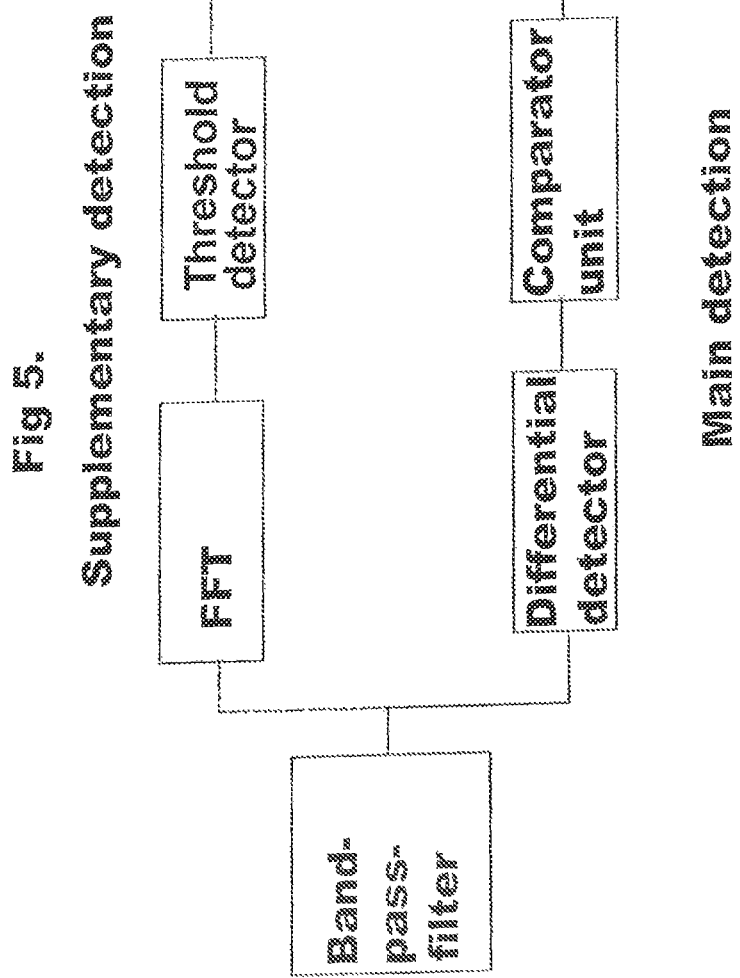

FIG. 5 discloses a flow chart giving the signal processing steps for both main detection and supplementary detection, said steps are used to determine whether the received reflected signals are Doppler shifted.

DETAILED DESCRIPTION OF THE INVENTION AND PREFERRED EMBODIMENTS

The invention consists of a rod provided with a receiver with a corresponding signal processing unit intended to receive reflected radar signals transmitted from a radar generating and radar transmitting antenna located in the rod. The receiver registers the received signals and transfer these signals to a specific signal processing unit that performs analyzing steps to determine whether the signals have been Doppler shifted and whether these Doppler shifts are likely to depend on the movement of the chest due do the breathing of a living person buried in the collapsed ground.

In addition to the device, the invention also relates to a method for detecting movements within the collapsed ground. The method utilizes the device according to claim 1 and the claims dependent upon this claim. The receiver according to the invention will be described first and after that a description of the method will follow.

In a first embodiment the receiver according to the invention comprises a rod or a pole (1) intended to be brought into the ground. Within the rod there is provided a radar transmitting antenna and a receiving device for receiving and registering radar signals. Said receiving device could be any well-known receiver adapted to receive radar signals. The receiver provided in the rod (1) is electronically connected to a signal processing unit to which said received and registered radar signals are transferred. The purpose of the signal processing unit is to analyze the received radar waves to determine whether there has been a Doppler shift of the signals relative the known transmitted out-signals. As has been described earlier a Doppler shift would give an indication that something in the collapsed ground is moving. Since the possible movement of a person buried in the masses, such as an avalanche victim, is severely constrained it is essential that the signal processing unit is capable of detecting the minute movement relative the radar transmitting device. To fulfill these high demands the signal processing unit is provided with a band-pass filter, a differential detector, a comparator and a decision processor whose combined purpose is to analyze the received signals and in a quick and secure way determine whether a Doppler shift is present in the received signals. The signal processing step according to the above given is referred to as main detection and constitutes the fundamental signal processing. Further signal processing steps, referred to as supplementary detection, can also be used. Said supplementary detection will be described separately.

The band-pass filter in the signal processing unit performs a first sorting of the incoming data in the form of received radar signals. By adjusting the band-pass filter so that it discards all signals that are not likely do derive from humans a first reduction of the in-data is obtained. Those signals that survive this sorting step are transferred to a differential detector.

The purpose of the differential detector is to continuously compare the amplitudes of the signals that have passed the band-pass filter to create a derivative (slope of the curve) that represent the change of the received signals. By continuously is meant that the signal is sampled many times during a short time interval, for example 100 times per second. It is from these samplings that a comparison is made and a measure of the derivative is obtained. The derivative of the amplitude will take the values, zero, positive or negative. To obtain the information relevant for the detection about the derivative the signal processing also creates an absolute value of the derivative. To lessen the influence of fluctuations of the derivative and possible faults due to multiples of the Doppler frequencies relative the sampling frequency is this specific signal processing unit also designed to create a mean value of this absolute value (usually based on 2-5 samplings). When this is done the corresponding value of the derivative is transferred to a comparator/decision processor that compares the obtained value with a threshold value that corresponds to the background noise in the collapsed ground. If the value of the derivative obtained from the differential detector is above the determined threshold value the signal processing unit judges that a Doppler shift has been detected in the received radar signals. The signal processing unit can be provided with a presentation device, for example a display or a sound device that informs the user that a Doppler shift has been detected.

This is the functionality of the signal processing unit that makes it possible to detect the very small signal changes that the device according to the invention pertains to detect.

In a second embodiment of the receiver according to the invention reference is made to FIG. 3, in which drawing there is shown that the rod (1) is divided into sections (2) in the length direction. It could for example be four sections evenly distributed along the rod. Each of these sections contains its own designated radar receiver. Each of these receivers is electronically connected to a signal processing unit. The functionality of the signal processing unit is the same as the one described in the first embodiment. According to the invention each of these sections can have its own designated signal processing unit, or as an alternative there can be used a central signal processing units that processes data from all sections. The purpose of the division of the rod into sections is to make it possible to search through different height levels in the collapsed ground when the rod has been brought into the ground. With four such sections it is therefore possible to search through four different height levels in the ground at the same time. It is obviously possible to use more or fewer sections depending on how sensitive the search shall be. The function of each of the sections is identical with the functions described with regard to the first embodiment. The only difference is that the received radar signals are treated on its own and therefore yields more information, namely the depth where the Doppler shift has been detected. If a certain section receives a signal that is processed by the signal processing unit the signal processing unit can be designed to inform whether a Doppler shift has been detected but also that the receiver on this specific section was the receiver that received the shifted signal. In this way it is possible to plan the digging based on the depth level that the buried person was detected. If the depth is substantial than automated digging means, such as an excavator, might be used while at a lesser depth the use of a shovel or some other manually operated tool might be called for to ascertain that the buried person won't get hurt.

In a third preferred embodiment of the invention, which builds upon the sections described above in the second embodiment, sectors (3) are provided in each of the sections, see FIG. 3. Each sector is provided with a receiving device connected to a signal processing unit. Since a section can be provided with a number of sectors, provided peripherally on the rod, an indication of the direction of the detection of the Doppler shift can be obtained. By designing the presentation unit so that said unit provides out-data in the form of which specific sector in a specific section that made a detection this particular embodiment provides for three essential information parts for the rescue crew, namely, that a Doppler shift has been detected, which indicate a buried person, the depth where said detection has been made and in what direction relative the rod that the source of the Doppler shift has been detected. This substantial information can then be used so that the rescue crew can optimize the rescue work by digging at the right place and with appropriate digging tools. The number of sectors that shall be used in each section is not decisive but if a smaller number of sectors are used one obviously get a poorer localization than would be the case if a larger number were used. In FIG. 3 there is shown, in an enlarged view on the right side of the figure, that 4 sectors are used. This is however only an example. In the expanded view in FIG. 3 it is schematically shown how an alarm can be used to show where a living person is located. The white triangle gives an indication that a Doppler shift corresponding to the fact that a living person has been detected in this particular direction.

Above the so called main detection has performed the signal receiving and signal processing steps. A separate and parallel procedure can also be used in all of these embodiments, namely supplementary detection. Supplementary detection is not necessary to make the invention work but it provides for a way to obtain a more reliable procedure to determine Doppler shifts.

Common method steps for the supplementary detection and the main detection are the signal receiving as well as the transfer of the received signal to the signal processing unit. When the signal has been transferred to the signal processing unit the common step of band-pass filtering the signals is performed, this to sort out Doppler shifts that most probably does not derive from a buried but alive person. Those signal components that thereby remains for further signal processing steps are mainly resulting from movements of the chest during breathing.

The next step during the supplementary detection transforms the signals to the frequency domain through DFT (FFT). DFT and FFT stands for Discrete Fourier Transform and Fast Fourier Transform, respectively, these are well known transforms within the technical field.

Based on the transformed signal there is now instead performed a frequency/amplitude detection. In this step either the frequency change or the amplitude change of the signal is determined in pre-set time intervals that correspond to the breathing frequency of a human being.

The value obtained during the above given step is then compared with a threshold value in a decision processor. As described earlier the threshold value corresponds to a predetermined value of the background signal. If the value obtained from the detected frequency or amplitude change is above the threshold value a Doppler shift is considered to have been detected, as before.

As a possible last step in the supplementary detection the result of the process is transferred to a presentation unit that informs the user about the result.

Main detection and supplementary detection can be performed in parallel on the same signal, see FIG. 5. It is however also possible to perform the tasks separately for different received signals.

When it comes to the design of the rod in the device according to the present invention it is preferable if the rod is hollow to allow for the components and units to be embedded into the rod, which in turn provides a shielding against wearing and damp and dust. The rod should be made of a material that is transparent for radar energy. Possible materials could for example be plastics.

Besides the above given relating to a device the invention also pertains to a method for searching collapsed ground for victims through the use of a device according to the present invention. The method steps given in point form are:
1) The rod in a device according to the present inventions is brought into the ground that shall be searched for buried victims.
2) An antenna provided in the rod generates a radar signal and transmit it into the collapsed ground.
3) The receiver according to the invention receives the radar signals that have been reflected from objects in the ground. A band-pass filter in the receiver sort out those frequencies that most probably does not derive from buried but living humans. The remaining signals are transferred from the receiver to a signal processing unit.
4) A differential detector in the signal processing unit is used to obtain a measure of the derivative of the received signals. An absolute value of the derivative is generated by the differential detector and transferred to a decision processor or a comparator unit. The decision processor, or comparator unit, compares the absolute value of the derivative with a pre-set threshold value corresponding to the value of the background noise in the ground. If the measure of the absolute value of the derivative exceeds said threshold value, the decision processor or the comparator unit transmit information to a presentation unit which informs the user of the fact that a Doppler shift has been detected, which fact in turn corresponds to the situation that a detected object is moving relative the transmitted radar signals.
5) Based on the obtained information the digging is commenced to thereby excavate a possible victim.

Finally it is possible to further refine the method by performing the method steps at various different positions. The data output from the various positions can then be compared to obtain a better positioning of the buried moving object by means of triangulation.

The invention claimed is:
1. A device for receiving and processing signals reflected from objects in the ground comprising
   a rod to be inserted into the ground,
   a radar information generating unit including an antenna provided in the rod for transmitting radar signals into the ground,
   at least one signal receiving unit provided in the rod for receiving radar signals reflected from an object in the ground, and
   a signal processing unit connected to the at least one signal receiving unit and containing as units for main detection
   i) a band-pass filter that blocks frequencies outside the interval 0.3-10 Hz,
   ii) a differential detector that compares the amplitudes of the signals that have passed the band-pass filter to create a derivative of the received signals, of which the absolute value is created, and
   iii) a comparator and decision processor unit that compares the absolute value of the derivative with a threshold value that corresponds to the background noise in the collapsed ground and decides whether a reflected signal has been Doppler shifted in a way that is likely to be by the breathing movement of a buried person,
   characterized in that the rod in its length direction is divided into multiple sections, each section of the rod having thereon the at least one signal receiving unit connected to the signal processing unit, the sections corresponding to different length segments of the rod and providing indication of the ground depth where a moving object has been detected, and
   characterized in that each section is radially divided into sectors disposed peripherally around the rod, each sector carrying the at least one signal receiving unit connected to the signal processing unit, whereby signals received by a specific receiving unit are processed to determine whether a reflected radar signal has been Doppler shifted and thereby determine whether an object in the ground is moving, each sector providing information about angular positioning of the object relative the rod where the Doppler shift was detected.

2. A method for determining the position of a buried moving object by using a radar transmitting unit and a device according to claim 1, the method comprising the steps of
   a) inserting the rod into the ground,
   b) generating by the radar information generating unit a radar signal into the ground,
   c) receiving by the receiving unit radar signals reflected from an object in the ground and transferring these signals to the signal processing unit,
   d) blocking by the band-pass filter radar signal frequencies outside 0.03-10 Hz and transferring non-blocked radar signals to the differential detector,
   e) determining by the differential detector the derivative of the amplitude of the non-blocked radar signals and an absolute value of this derivative,
   f) comparing by the comparator and decision processor the determined absolute value of the derivative with a threshold value corresponding to background noise in the ground, and when the determined absolute value is larger than the threshold value, finding a Doppler shift is detected that is likely caused by movement of a buried object, and
   g) presenting by a presentation unit the finding of the previous step.

3. The method according to claim 2, further comprising, with the rod inserted in the ground at different locations, repeating all the steps at each location, and determining the position of the buried object by triangulation using the results obtained by repeating all the steps at the different locations.

* * * * *